United States Patent
Abe

[11] 3,797,319
[45] Mar. 19, 1974

[54] PROCESS FOR MEASURING PARTICLE SIZE AND CONCENTRATION OF SLURRIES ACCORDING TO ON-STREAM ANALYSIS

[75] Inventor: Toshihiko Abe, Sendai, Japan

[73] Assignee: Director-General of Agency of Industrial Science and Technology, Tokyo-to, Japan

[22] Filed: Aug. 8, 1972

[21] Appl. No.: 278,816

[52] U.S. Cl. .............................. 73/432 PS
[51] Int. Cl. ............................... G01n 15/00
[58] Field of Search ....... 73/432 PS, 61 R; 356/102, 356/208

[56] References Cited
UNITED STATES PATENTS
3,498,719  3/1970  Wing et al. ............... 356/208 X
3,719,090  3/1973  Hathaway ................. 73/432 PS Primary Examiner—James J. Gill
Attorney, Agent, or Firm—William J. Daniel

[57] ABSTRACT

A process for measuring particle size and concentration of a slurry according to on-stream analysis is provided wherein a slurry to be measured is impacted at a given velocity against a plate to measure impact energy thereof, simultaneously with light transmission of the slurry being measured, the results of the individual measurements are supplied as information to a data memory collation device to check the information with data previously stocked in the device, thereby converting the information into the corresponding slurry concentration and average particle size.

1 Claim, 4 Drawing Figures

PROCESS FOR MEASURING PARTICLE SIZE AND CONCENTRATION OF SLURRIES ACCORDING TO ON-STREAM ANALYSIS

THE FIELD OF THE INVENTION

This invention relates to an improved process for automatically measuring average particle size and concentration of slurries.

BACKGROUND OF THE INVENTION

For facilitating control of operating conditions such as those for automated flotation or suspension polymerization, it is desirable to keep a constant slurry concentration or average particle size. For this purpose, slurry concentration and particle size must be measured and suitable conditions therefor must be selected.

There has been proposed a method of measuring a slurry concentration and particle size by way of γ-rays or percent transmission. This method gives relatively accurate results in case of an uncolored slurry having a narrow range of particle size distribution, but is subject to the disadvantage that a considerable error is produced in case of a colored slurry or a slurry having a particle size distribution over a wide range. In a slurry containing fine particles in combination with coarse particles, as the fine particle concentration becomes higher, the behavior of the coarse particles is disturbed by the fine particles, making measurement of coarse particles inaccurate. Therefore, the concentration of fine particles that can be tolerated is naturally limited.

There has been known a method in which a liquid cyclone is placed in a slurry conduit to take a part of the slurry, the slurry taken is subjected to centrifugal separation to separate the particles and then particle size distribution is determined. According to this method, however, only a very low accuracy can be expected of the suspension and a long period of time is required for the measurement, thus making a continuous operation impossible. Therefore, the method is of no practical value.

It is an object of this invention to provide an improved process for measuring particle size and concentration of slurries according to on-stream analysis, thereby overcoming the drawbacks of the prior arts.

DETAILED DESCRIPTION OF THE INVENTION

After many investigations for the purpose of developing a process for measuring slurry concentration and average particle size continuously and accurately in a simple manner, the inventor has found that this objective can be attained easily by continuously measuring the percent transmission of slurry and impact energy of particles of the slurry at the same time and comparing the results of the measurement with data previously obtained from model samples to convert the results into the corresponding concentration and average particle size. The present invention has been accomplished on the basis of this finding.

In accordance with the process of this invention, accurate concentration and average particle size can be determined automatically according to on-stream analysis by introducing a part of a slurry into a side pipe branched from a slurry conduit or a reaction pipe, keeping the flow velocity constant by a proper means, impacting the slurry against a plate such as diaphragm placed at a right angle or a predetermined angle to the flow direction of the slurry, measuring the impact energy by a proper means such as change in acoustic output, measuring continuously light transmission of the slurry by a proper means such as change in absorbancy, supplying the results of these measurements into a data memory collation device and checking the informations with data previously stored in the device, thereby converting the information into the corresponding concentration and average particle size.

If desired, the data on concentration and average particle size of the slurry thus obtained may be memorized by a memory device or directly sent as instruction signals to a control device to regulate conditions of treatment such as the grinding conditions of ores.

The data memory collation device and control device mentioned above may be obtained by suitably modifying commercially available miniature computers.

Figure 1:
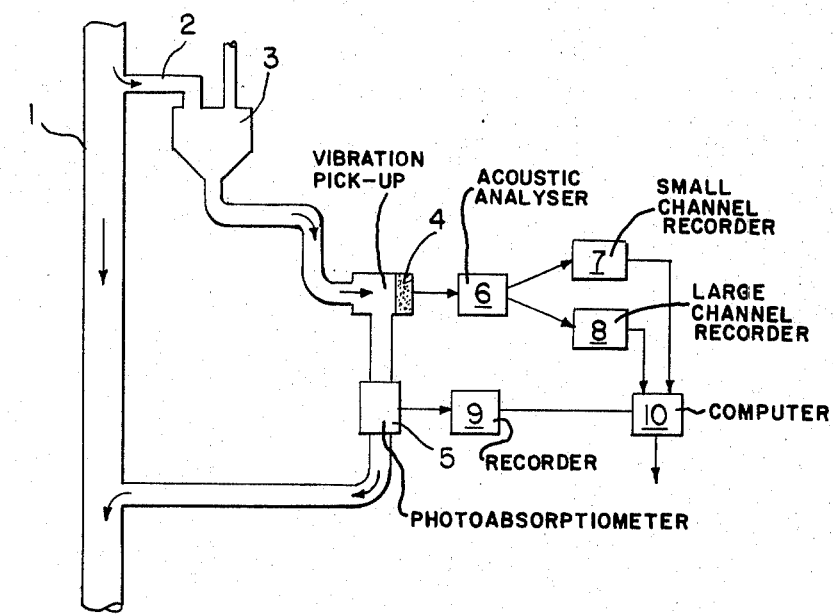
Figure 2:
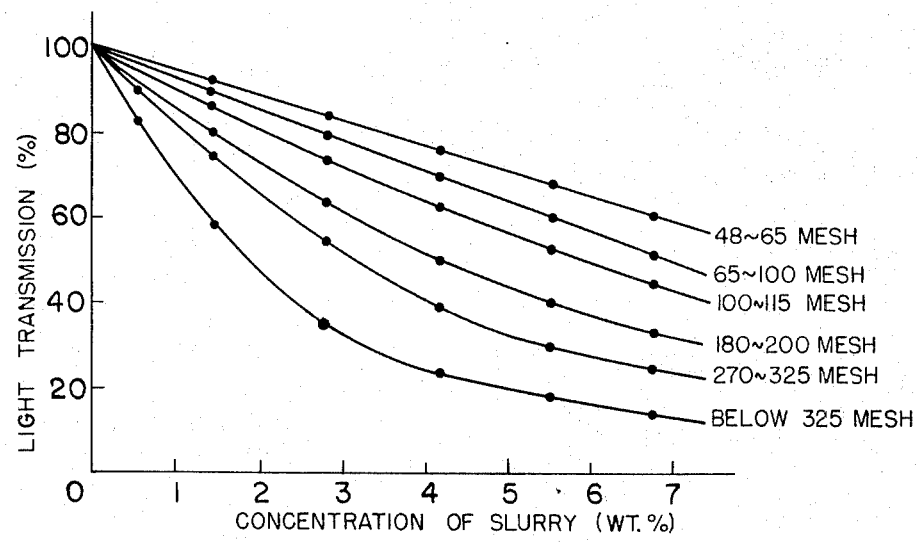
Figure 3:
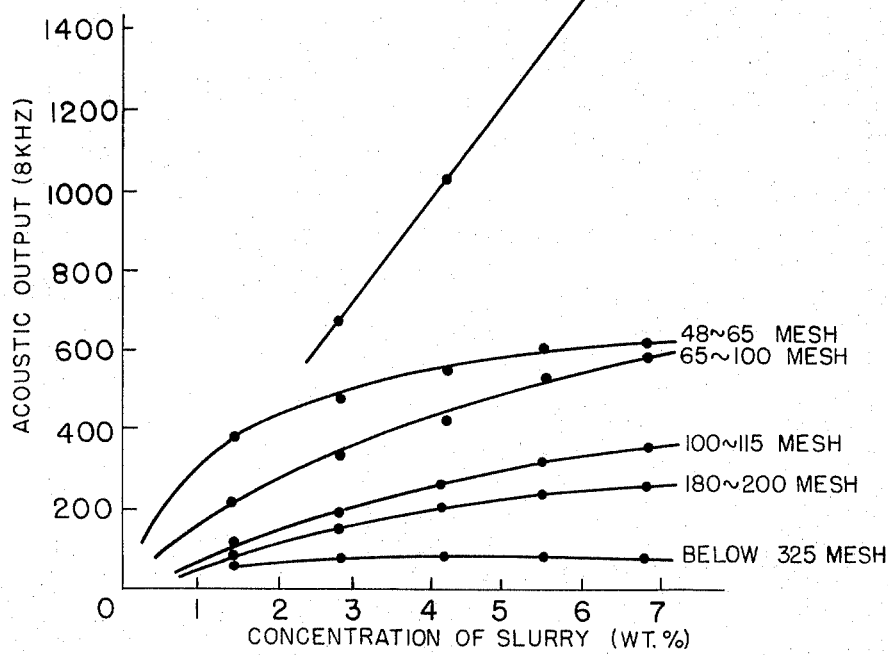
Figure 4:
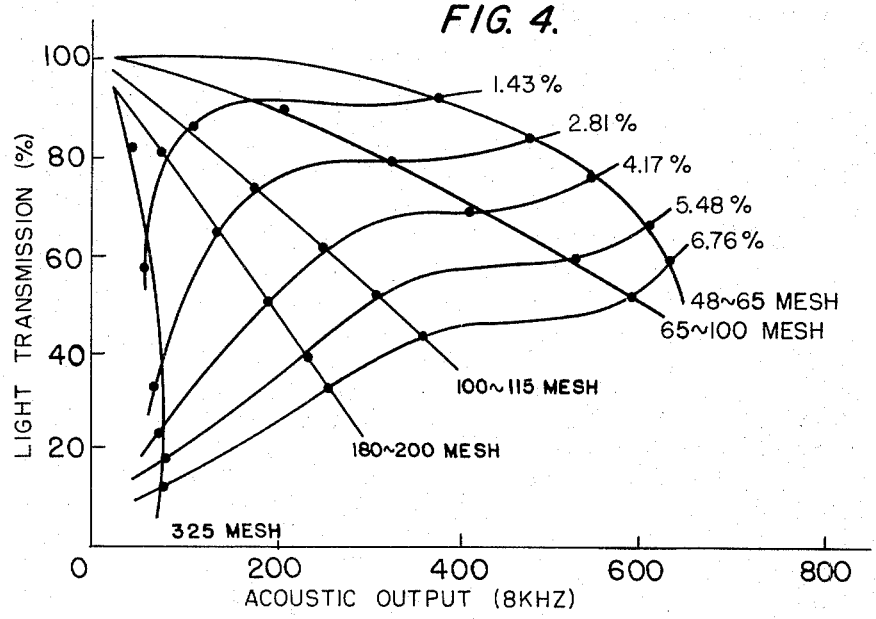

FIG. 1 is a schematic drawing showing an embodiment of a device used in the process of this invention. FIG. 2 is a graph showing the relationship between slurry concentration and percent transmission (white light) of a model sample. FIG. 3 is a graph showing the relationship between slurry concentration and acoustic output. FIG. 4 is a graph composed of FIGS. 2 and 3.

An embodiment of the invention will be illustrated with reference to the accompanying drawings.

In FIG. 1, a part of slurry is introduced into a side pipe 2 branched from a slurry conduit 1, diluted properly in a dilution tank 3 and returned again to the slurry conduit 1 through a solid vibration pick-up 4 and a photoabsorptiometer 5. The solid vibration pick-up 4 is provided with a diaphragm placed at a right angle to the flow direction of the slurry. If particles of the slurry are impacted against the diaphragm, oscillatory waves of a strength proportional to mass of the particles are caused. The oscillatory waves are analyzed by an acoustic analyzer 6. Those of a small channel are recorded by a high speed intermittent recorder 7 and those of a large channel are indicated on a Braun tube 8 and recorded photographically. The results of measurement by the photoabsorptiometer 5 are recorded by a recorder 9. The data thus recorded are converted into suitable input signals and sent to a register 10 of a computer where data on acoustic output and percent transmission obtained by measuring a model sample of a predetermined concentration and average particle size have been memorized and the corresponding concentration and average particle size are decoded according to the input signals. The results thus decoded are released as desired information by a suitable indication means.

FIGS. 2 and 3 are graphs indicating the relationship between slurry concentration and percent transmission (white light) and the relationship between slurry concentration and acoustic output (determined a fixed frequence of 8 KHz), respectively. The sample used was light brown powder obtained by pulverizing siliceous sand of a good quality with a wet ball mill, the sample being classified into groups as shown in Table 1 according to particle sizes. The percent transmission was measured with an photo-absorptiometer (a product of Hitachi Manufacturing Works) and the acoustic output was measured with Rion SA-20A.

TABLE 1

| No. | I | II | III | IV | V | VI | VII |
|---|---|---|---|---|---|---|---|
| Particle size: | | | | | | | |
| Mesh | 28-32 | 48-65 | 65-100 | 100-115 | 180-200 | 270-325 | 325 |
| $\mu$ | 590-500 | 297-210 | 210-147 | 147-125 | 82-74 | 53-44 | 44 |

FIG. 4 is a graph composed of FIGS. 2 and 3.

Regression analysis of FIG. 4 reveals that the following equation is obtained from particle diameter $D$ ($\mu$), percent transmission $L$ (%) and acoustic output $S$ and (mV).

$$D = 5.2 \{(L - 93.5) + \sqrt{(L - 93.5)^2 + 7.4S}\}$$

Particle diameters calculated according to this equation are compared with the corresponding, actually obtained particle diameters, the results being shown in Table 2.

TABLE 2

| Particle diameter ($\mu$) | Slurry concentration (wt.%) | | | | |
|---|---|---|---|---|---|
| | 1.43 | 2.81 | 4.17 | 5.48 | 6.76 |
| 210-297 (average 254) | 271 | 261 | 250 | 236 | 219 |
| 147-210 (average 179) | 184 | 189 | 185 | 196 | 189 |
| 125-147 (average 136) | 118 | 110 | 115 | 115 | 115 |
| 74-82 (average 78) | 77 | 74 | 72 | 75 | 74 |
| below 44 | 32 | 23 | 21 | 22 | 20 |

It is apparent from the table that close agreement is obtained between the calculated values and the practically obtained values. This suggests that concentration and average particle size of any slurry can be determined with an extremely high accuracy according to FIG. 4.

The process and apparatus of the invention may be applied to not only ore slurries but also other slurries such as coating agents, for example, pains and lacquers, catalyst suspensions and polymer slurries.

The process of the invention can be applied to not only colorless slurries but also colored slurries containing particles of different density or color to afford accurate measurement results.

If particle size is to be measured according to only light transmission, a special complicated measured according and troublesome procedures are required for analyzing minute changes in transmission. It is to be noted, however, that according to the process of this invention, both concentration and particle size can be measured accurately by using a simple device. Thus, the invention is quite advantageous for practical use.

The present invention will be illustrated in more detail by way of an example.

Example

Particle size and concentration of black ore slurry were measured by using a device shown in FIG. 1.

In this example, a light source slit of the photo-absorptiometer 5 was fully opened. Acoustic output (5 KHz) was so regulated as to keep the output of the internal calibrating device at +10 dB over all passes on the Braun tube. Sensitivity of the vibration pickup was −49.2 dB. Light absorbance was recorded by a recorder and output power of sound was recorded by the aid of a 6-pen recorder and a film.

Particle sizes thus obtained are shown in Table 3 in comparison with actual particle sizes.

TABLE 3

| | −200 mesh over (%) | | | | | |
|---|---|---|---|---|---|---|
| Value obtained by the process of the invention | 57.9 | 60.3 | 62.4 | 64.6 | 68.4 | 71.7 |
| Actual value | 58.1 | 60.3 | 62.7 | 65.2 | 68.0 | 70.9 |

Slurry concentrations thus obtained are shown in Table 4 in comparison with actual concentrations.

TABLE 4

| | Concentration (wt. percent) | | | | | | | | |
|---|---|---|---|---|---|---|---|---|---|
| Value obtained by the process of the invention | 3.27 | 3.52 | 3.84 | 4.13 | 4.44 | 4.74 | 5.00 | 5.24 | 5.44 |
| Actual value | 3.24 | 3.53 | 3.81 | 4.09 | 4.37 | 4.65 | 4.92 | 5.20 | 5.47 |

The tables obviously show that according to the process of this invention, quite excellent results are obtained even from a colored slurry.

What is claimed is:

1. A process for measuring particle size and concentration of a slurry according to on-stream analysis, characterized in that a slurry is impacted at a predetermined velocity against a plate to measure impact energy thereof, simultaneously with light transmission of the slurry being measured, the results of the individual measurements are supplied as information to a data memory collation device to check the information with data previously stocked therein suggesting the interrelation between concentrations and particle sizes of slurries, impact energy at a predetermined velocity and light transmission, thereby converting the information into the corresponding slurry concentration and average particle size.

* * * * *

UNITED STATES PATENT OFFICE
CERTIFICATE OF CORRECTION

Patent No. 3,797,319      Dated March 19, 1974

Inventor(s) Toshihiko ABE

It is certified that error appears in the above-identified patent and that said Letters Patent are hereby corrected as shown below:

In the Heading of the Patent, add the following --

[30] Foreign Application Priority Data

Aug. 13, 1971      Japan      61746/Sho. 46 (1971) --.

Signed and sealed this 9th day of July 1974.

(SEAL)
Attest:

McCOY M. GIBSON, JR.      C. MARSHALL DANN
Attesting Officer      Commissioner of Patents